United States Patent [19]
LaFiandra

[11] Patent Number: 5,940,203
[45] Date of Patent: Aug. 17, 1999

[54] HIGH-ENERGY-BURST DEFORMABLE MIRROR

[75] Inventor: Carlo F. LaFiandra, New Canaan, Conn.

[73] Assignee: Raytheon Company, Lexington, Mass.

[21] Appl. No.: 08/982,920

[22] Filed: Dec. 2, 1997

[51] Int. Cl.⁶ .................................................. G02B 26/00
[52] U.S. Cl. ......................... 359/290; 359/223; 359/224; 359/198; 29/898.07; 248/467; 248/468
[58] Field of Search ....................... 359/290, 846, 359/850, 223, 224, 198, 230, 221; 29/898.07; 248/467, 468

[56] References Cited

U.S. PATENT DOCUMENTS

| | | | |
|---|---|---|---|
| 3,758,199 | 9/1973 | Thaxter | 359/223 |
| 4,129,930 | 12/1978 | Dragt | 359/223 |
| 4,626,063 | 12/1986 | Honey | 359/221 |
| 5,245,464 | 9/1993 | Jensen | 359/224 |
| 5,276,545 | 1/1994 | Daun et al. | 359/198 |
| 5,438,451 | 8/1995 | Schweizer | 359/224 |
| 5,550,669 | 8/1996 | Patel | 359/224 |

*Primary Examiner*—Loha Ben
*Attorney, Agent, or Firm*—W. C. Schubert; G. H. Lenzen, Jr.

[57] ABSTRACT

An assembly comprises a base (16) and a thin optical substrate (10) having a light reflective first surface (12) and an opposite back surface (14). At least one actuator (20) is mounted to said base and has a moving end (21) associated with the back surface of said optical substrate. A metallic button (18) is interposed between and connected through associated joints respectively to the moving end (21) of the actuator and said back surface (14) of the optical substrate to protect the actuator to substrate connection.

9 Claims, 3 Drawing Sheets

HIGH-ENERGY-BURST DEFORMABLE MIRROR

BACKGROUND OF THE INVENTION

The present invention relates to a deformable mirror primarily intended for use as a beam train optic, and relates more particularly to a unique configuration of a deformable mirror capable of operating in an environment of an extremely high incident energy burst, such as at the National Ignition Facility now under design.

It is most important that a support for a high energy burst mirror be capable of withstanding the complete environment in which it operates without degradation. None of the current designs of such supports are capable of doing this. The present invention is designed to work in the National Ignition Facility now being designed to produce sources of energy for the world by controlled fission. This facility requires 200 deformable mirrors for operation. The prior art consists of conventionally designed deformable mirrors where the actuators are attached directly to the back of the mirror with epoxy 3 as seen in FIGS. 1 and 2. These mirror to actuator connections have failed in controlled tests. In addition, Lawrence Livermore National Labs now has produced a configuration with a circumferential joint to the back of the deformable mirror as seen in FIG. 2. This configuration will deteriorate with time since the joint still experiences part of the incident energy.

Empiric data indicates that conventionally designed deformable mirrors fail in high burst energy mode environments because the epoxy joint between the back of the mirror and the top of the actuator gets too hot for even high temperature epoxies to survive (typically 400 to 600 degrees F.) In addition, analysis indicates that because of the short time duration of the energy burst, any metal subjected to the energy will get hot at the incident surface, but within one millimeter of depth, the temperature will rise no more than several degrees F.

Deformable mirrors used in facilities such as the NIF are thus subjected to very high energy beams for very short durations. Typically 10 Joules/cm$^2$ for 200 microseconds. Conventionally designed deformable mirrors as seen in FIG. 1 would be destroyed by the heat generated because of absorption at the joint between the back of the faceplate 1 and the attached actuator 2. Likewise, the other design connection between the faceplate 1 and the actuator 2 with the circumferential joint connection undesirably absorbs energy at the joint interface.

Accordingly, it is an object of the present invention to provide a continually supported deformable mirror support that is low in cost and meets all of the requirements for use in a high energy burst mode without any degradation of performance of physical attributes.

A further object of the invention is to provide a joint to be used in a continually supported deformable mirror which operates without any degradation of its structural integrity as is now experienced with conventionally designed deformable mirror.

It is still a further object of the invention to provide a support of a simpler design to fabricate which uses lower cost materials, and is easier to assemble.

Yet a further object of the invention is to provide a joint at the back of the deformable mirror faceplate that is capable of sustaining high temperature environments and using the drop in temperature of metal in series with this joint to attach actuators with conventional epoxy.

SUMMARY OF THE INVENTION

The invention resides in an assembly which comprises a base and a thin optical substrate having a light reflective first surface and an opposite back surface. At least one actuator is mounted to the base and has a moving end associated with the back surface of the optical substrate. A metallic button is interposed between and connected through associated joints respectively to the moving end of the actuator and the back surface of the optical substrate to protect the actuator to substrate connection.

Ideally, the actuator to button connection includes an epoxy joint and the button to back surface connection includes a frit joint. Alternatively, the button to back surface connection may include a metallized joint.

Desirably, a block of similar coefficient of thermal expansion material as that of the optical substrate is additionally interposed between the back surface of the optical substrate and the metallic button. The block of ceramic material has one surface associated with the back surface of the optical substrate and is connected thereto by a fused, a metallized or a frit joint. In another embodiment, the button includes a flexure feature.

The assembly is preferably formed by providing a simple flat glass plate fabricated on a continuous parallel polisher/grinder machine and then adding the metallic buttons by joining same in predetermined locations on the rear surface thereof and maintaining the optical surface of the mirror and the buttons in a flat arrangement and then connecting the at least one actuator to the button by an epoxy joint.

DETAILED DESCRIPTION OF THE PREFERRED EMBODIMENT

Figure 1:
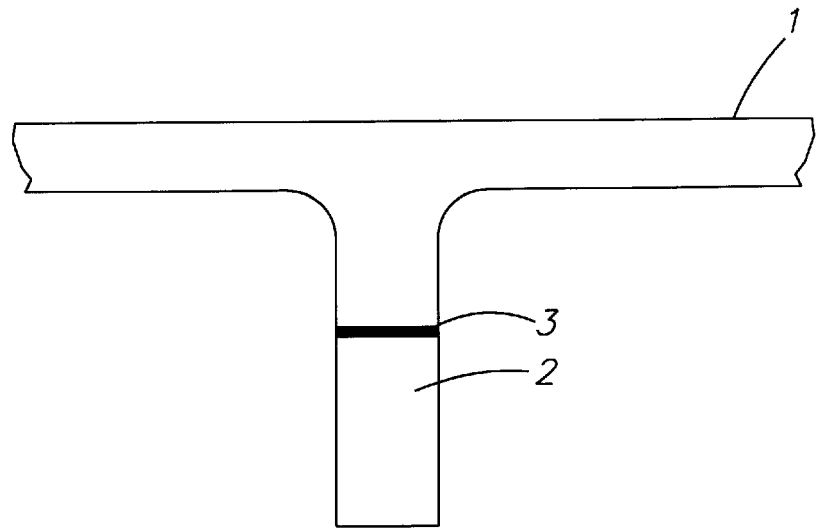
FIG. 1 is a schematic view of a prior art connection.
Figure 2:
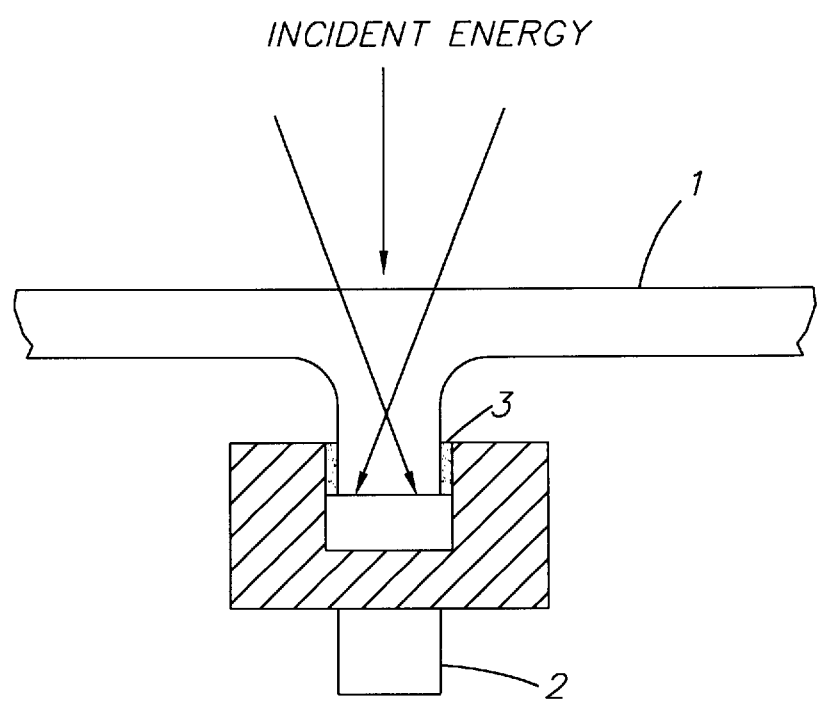
FIG. 2 is a schematic view of another prior art connection.
Figure 3:
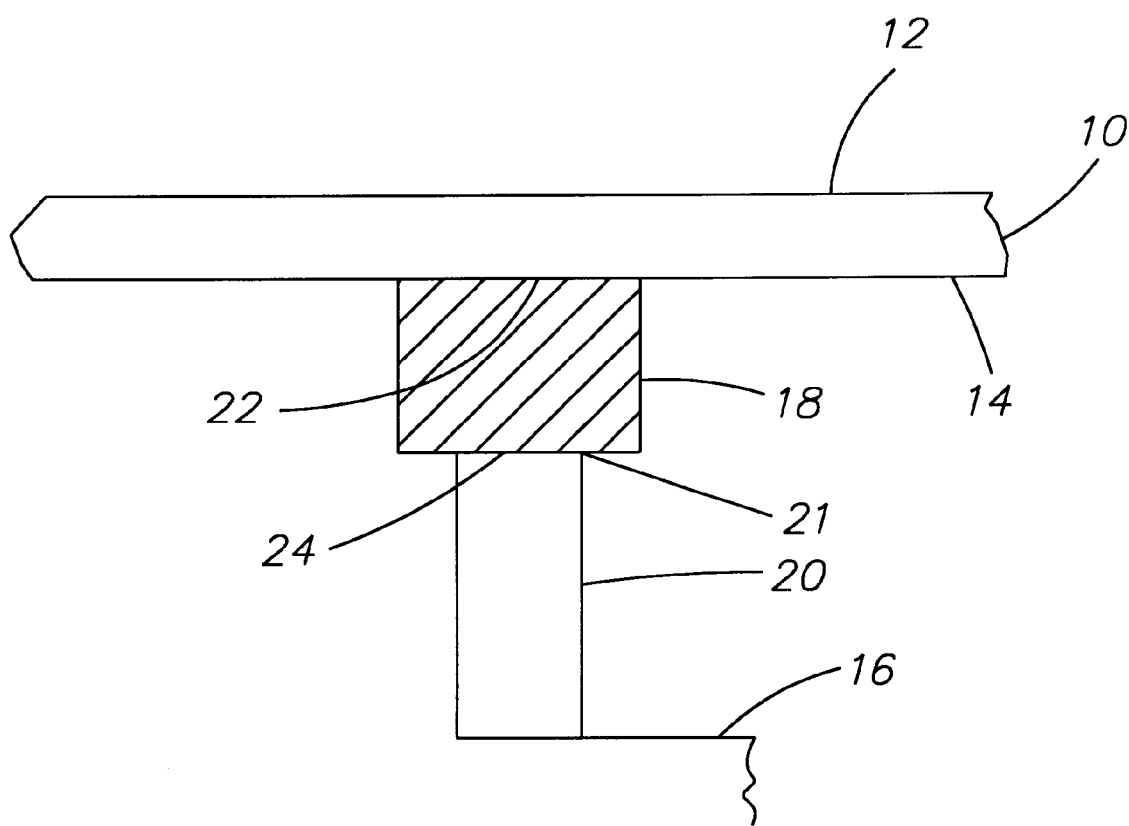
FIG. 3 is a schematic view of the invention.

The invention is as shown in FIG. 3. As illustrated, the invention includes a faceplate 10 with a front reflective surface 12 and a rear supportive surface 14 which faces a base 16. A plurality of actuators 20,20 are mounted to the base 16 and each has a moving end 21 which connects to the rear of the face plate or mirror 10 in a manner in accordance with the invention.

In accordance with the present invention, the rear surface 14 of the mirror 10 has a plurality of metal buttons 18,18 connected to it. A joint at the back of the deformable mirror faceplate that can sustain the high temperature environment and use the drop in temperature of metal in series with this joint to attach the actuators with conventional epoxy is disclosed herein. The configuration shown schematically in FIG. 3 shows the joint of the present invention. As shown therein, the faceplate 10 connects to the actuator 20 through a frit or metalized joint 22 used to attach metallic buttons 18,18 to the actuator 20 through a secondary epoxy joint 24.

Research shows that energy reaching the joint connection at the rear surface 14 heats it to temperatures beyond the rating of epoxies used. Metal in series with the energy will rise in temperature (at its surface) to approximately 500° F., and drops off in temperature with distance. At 1 mm from the impinging surface, the temperature is within a few degrees of ambient. In the preferred embodiment, the configuration shown in FIGS. 3 and 4 discloses the connection 22 at the rear surface 14 of the mirror 10 using a frit joint or a metallized joint capable of operating at approximately 1100° F.

Figure 4:
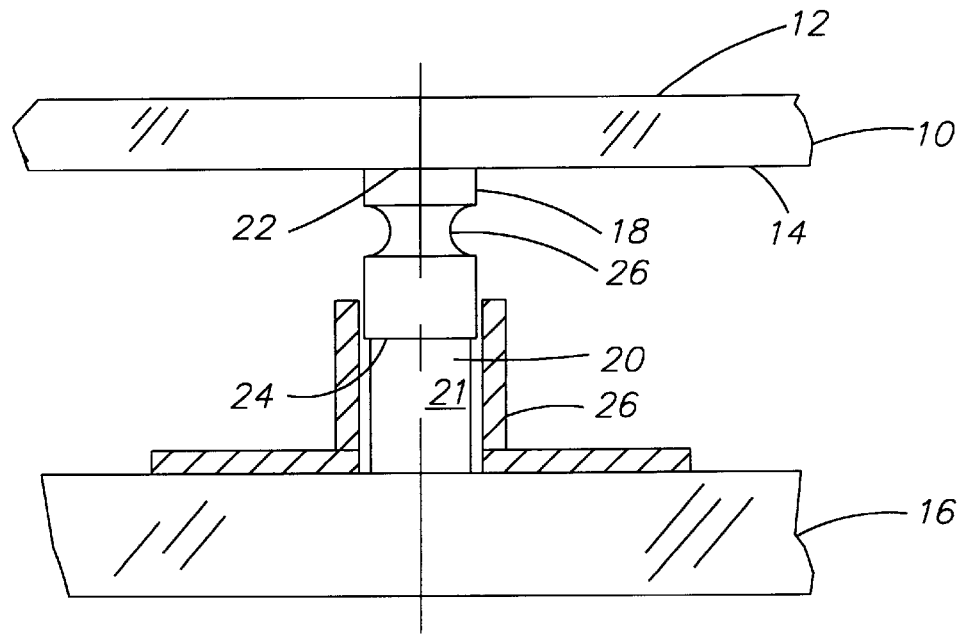
FIG. 4 is a detailed view of the invention shown schematically in FIG. 3.

In the embodiment of FIG. 4, the frit joint 22 attaches the metal button directly to the back of the mirror. The thickness of the joint 22 is made such that an actuator can be epoxy bonded at joint 24 disposed between the actuator end 21 and the button 18 in a temperature zone not affecting the bond strength. The placement of the metal button 18 in series between the moving end 21 of the actuator 20 and the rear surface 14 of the mirror is key to the concept.

Figure 5:
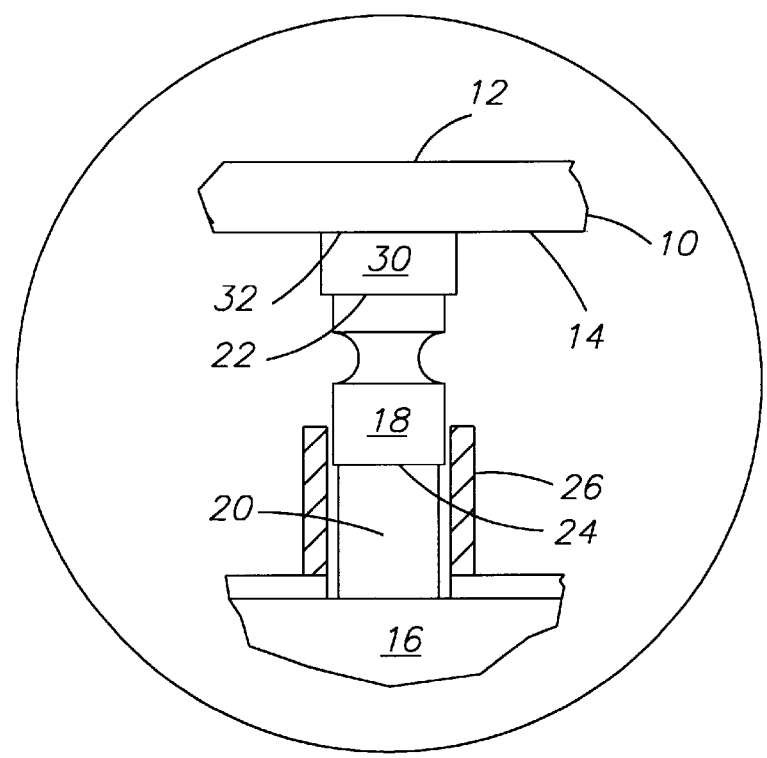
FIG. 5 is a detailed view of another embodiment of the invention.

As seen in FIGS. 4 and 5, the metal button 18 may or may not contain a flexure fillet 26. In either case, the use of a metallic button circumvents the thermal problem with ease of fabrication, e.g. low cost. If a flexure is not required, the metal button 18 is simply a short right angle cylinder 2 to 3 mm long. Frit is chosen to be compatible with the temperature of use as well as the properties of the materials to be joined.

As seen in the embodiment of FIG. 5, special cases, e.g. higher temperature resistance needed, could require a "graded" type seal joint also shown in the figure. In the embodiment of FIG. 5, a block 30 made from a glasseous or ceramic material having an interface surface 32 which is frit connected to the rear surface 14 of the face plate and to the top end of the button 18, which button opposite end being connected by epoxy to the moving end 21 of the actuator 20 at joint 24.

The deformable mirror 10 in the preferred embodiment is fabricated in the following manner. First, a simple flat glass plate is fabricated on a continuous parallel polisher/grinder machine. This is much less expensive than machining buttons on the back surface of the glass. The sides need not necessarily be parallel. Metal right circular cylinders may be used as the buttons 18 (FIGS. 4 and 5 show them with a flexure configuration) and fritted in predetermined locations on the rear surface of the plate with a fixture. This would be done at elevated temperatures below the melting point of the materials to be joined (typically 1000 degrees F.) At this point, the optical surface of the mirror and the plane of the backs of all of the buttons would be made flat. The actuators are then epoxy bonded to the base structure and the tops thereof all made coplanar with a lapping operation. A protective thermal shield 26 may further be installed, and the mirror with its associated fritted on buttons would be epoxy bonded to the actuators. Contacting techniques ensure mirror flatness during the bonding process. The mirror may then be coated as an assembly.

The normal softening point (the joint remains rigid up to this temperature) for the frit chosen is in the preferred embodiment is 900 degrees F., approximately 2 times what the first joint at the backside of the mirror faceplate will experience. The second epoxy joint at the actuator will experience approximately a 4 degree F. rise, well within its range of acceptability. Since the energy imparted is not a continuous flow of energy, but approximately 200 microseconds long, the total bulk temperature rise of the unit with the incident energy, between bursts, is under 10 degrees F. also well within the capabilities of the configuration.

Accordingly, the invention has been described by way of illustration and not limitation.

What is claimed is:

1. An assembly comprising:

a base;

a thin optical substrate having a light reflective first surface and an opposite back surface;

at least one actuator mounted to said base and having a moving end associated with the back surface of said optical substrate; and a metallic button interposed between and connected through associated joints respectively to the moving end of the actuator and said back surface of the optical substrate.

2. An assembly as defined in claim 1 further characterized in that said actuator to button connection includes an epoxy joint.

3. An assembly as defined in claim 2 further characterized in that said button to back surface connection includes a frit joint.

4. An assembly as defined in claim 2 further characterized in that said button to back surface connection includes a metallized joint.

5. An assembly as defined in claim 4 further characterized in that a block of glasseous or ceramic material is additionally interposed between said back surface of the optical substrate and said metallic button.

6. An assembly as defined in claim 5 further characterized in that said block of glasseous or ceramic material has one surface associated with said back surface of the optical substrate and is connected thereto by a metallized joint.

7. An assembly as defined in claim 6 further characterized in that said block of glasseous or ceramic material has one surface associated with said back surface of the optical substrate and is connected thereto by a frit joint and another surface connected to said metallic button.

8. An assembly as defined in claim 1 further characterized in that each said button includes a flexure.

9. An Assembly as defined in claim 1 further characterized in that the assembly is formed by providing a simple flat glass plate fabricated on a continuous parallel polisher/grinder macine; adding said metallic button by fritting same in predetermined locations on said back surface; maintaining the optical surface of the optical substrate and the button in a flat arrangement; and connecting said at least one actuator to the button by an epoxy joint.

* * * * *